July 8, 1958 E. F. FOLKS 2,842,272
PIPE-REVOLVING APPARATUS
Filed April 8, 1955 2 Sheets-Sheet 1
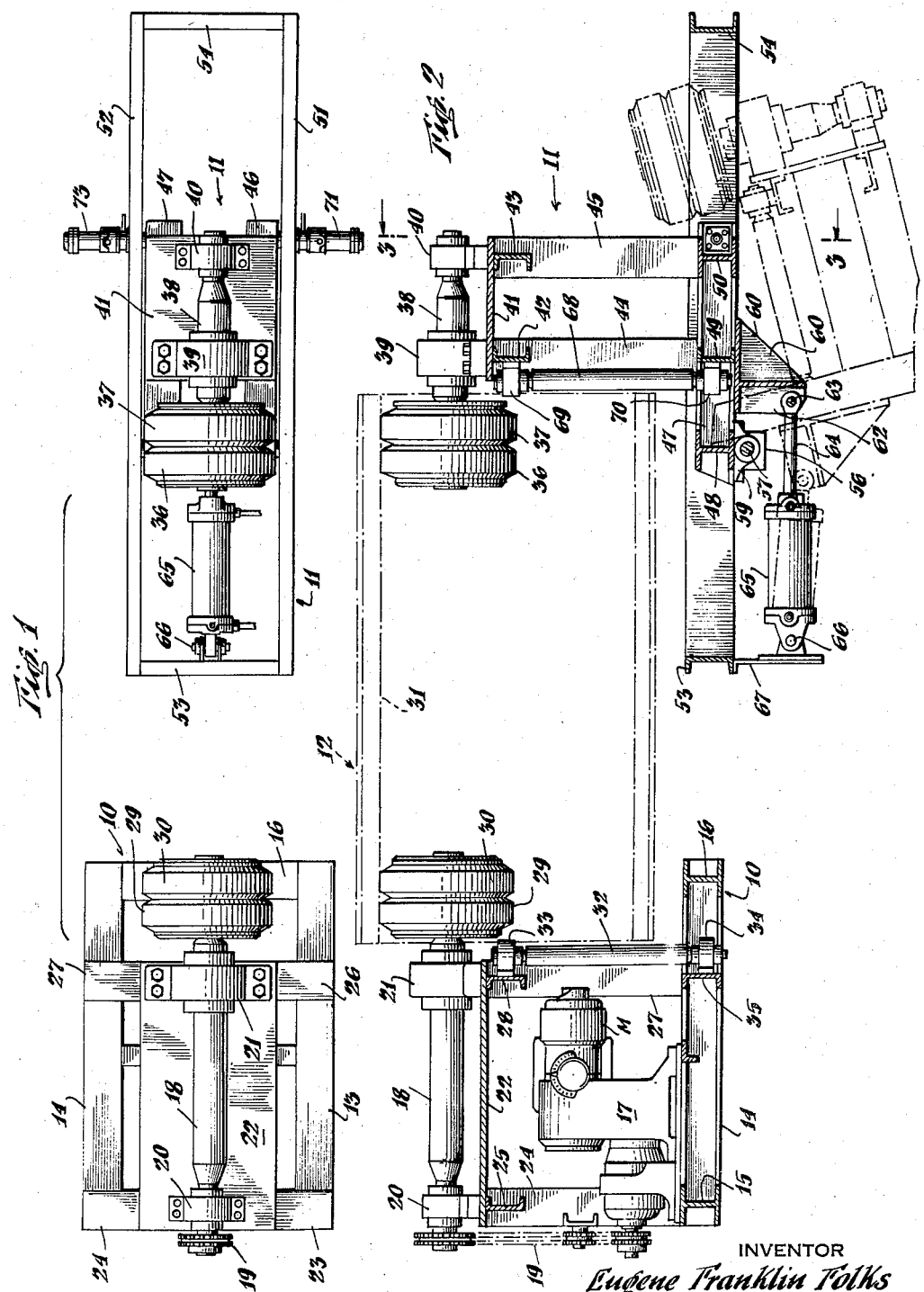
INVENTOR
Eugene Franklin Folks
BY
George F. Des Marais
ATTORNEY July 8, 1958
E. F. FOLKS
2,842,272
PIPE-REVOLVING APPARATUS
Filed April 8, 1955
2 Sheets-Sheet 2
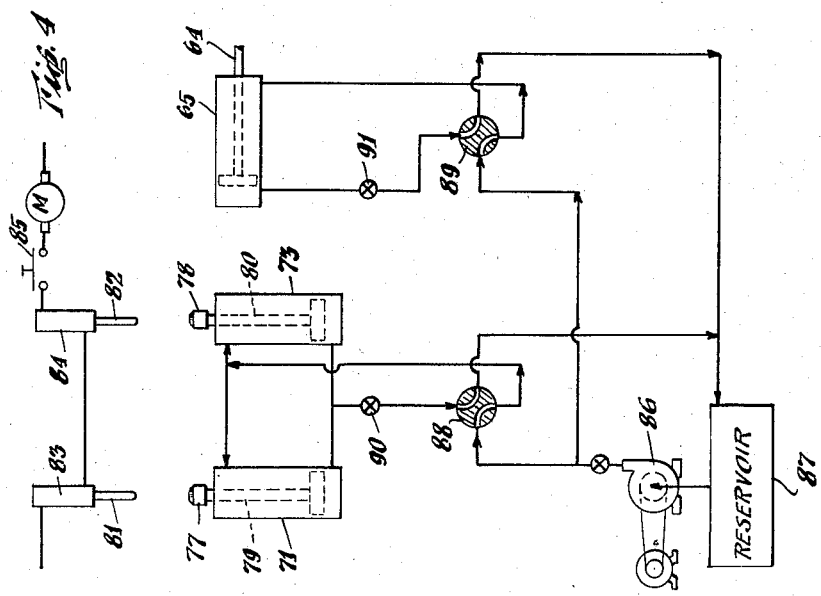
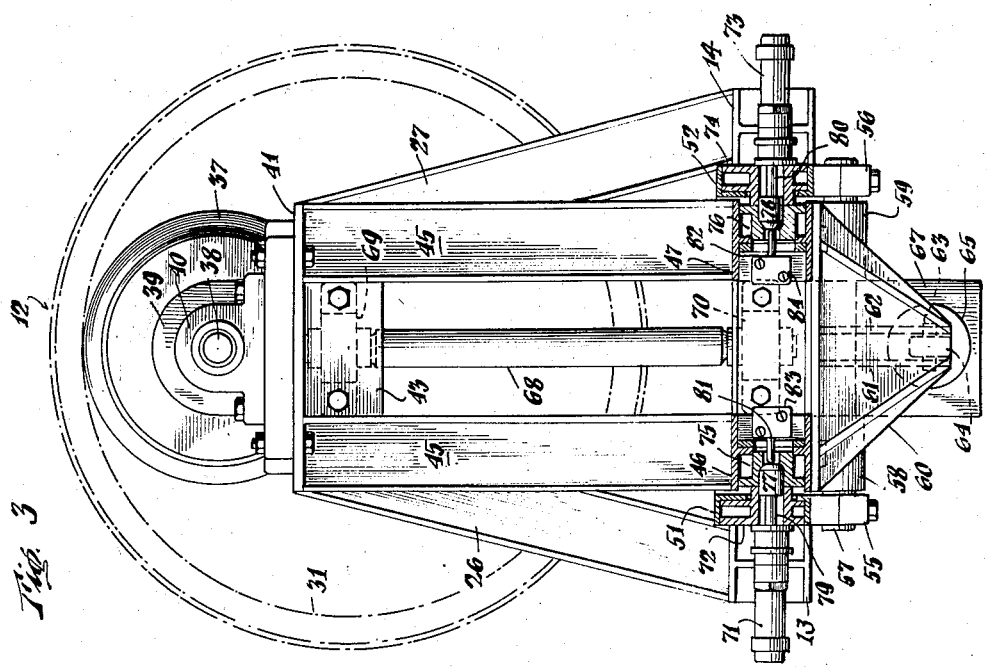
INVENTOR
Eugene Franklin Folks
BY
George F. DesMarais
ATTORNEY United States Patent Office 2,842,272
Patented July 8, 1958

2,842,272

PIPE-REVOLVING APPARATUS

Eugene Franklin Folks, Verona, N. J., assignor to Lock Joint Pipe Company, East Orange, N. J., a corporation of New Jersey Application April 8, 1955, Serial No. 500,190

4 Claims. (Cl. 214—1)

This invention relates to an apparatus for revolving a hollow body, such as a pipe or the like.

It is a purpose of the invention to provide an apparatus for use in applying coatings to the exteriors of pipes of various diameters. The apparatus includes a stationary support and a movable support, each of which mounts a rotatable shaft. One of the shafts is driven and each shaft carries a wheel which is adapted to frictionally engage the interior of a pipe. The pipe is freely suspended by the wheels. The coating material is applied by a gun or projecting device which directs the material against the exterior of the pipe as the projecting device moves alongside at a predetermined rate. Means are provided to avoid longitudinal shifting of the pipe with respect to the wheels.

The two shafts overlap the respective ends of the pipe to be coated when it is mounted on and supported by the wheels on the shafts. One of the shafts is mounted on a pivoted support and can be swung away from its operating position in order to enable the placement and the removal of a pipe from between the two supports. The movable support and a mechanism for locking the support in operating position are controlled hydraulically. A safety mechanism is provided for permitting the operation of the prime mover and the rotation of the driven shaft only when the movable support is locked in operating position. Other attainments of the invention will appear from the following description and the accompanying drawing, in which Fig. 1 is a plan of an apparatus embodying the principle of the invention;

Fig. 2 is an elevational view of the apparatus seen in Fig. 1 with parts shown in section;

Fig. 3 is an elevational view on line 3—3 of Fig. 1; and

Fig. 4 is a schematic showing of a controlling system.

The apparatus includes two supports 10 and 11 spaced apart sufficiently to accommodate between them the pipe 12 or other hollow body which is to be coated. The support 10 is stationary and it includes a base frame comprising a pair of structural members 13 and 14 and connecting cross-members 15 and 16. A prime mover consisting of a motor M and a variable speed drive 17 is mounted on the base frame. The prime mover drives a shaft 18 through a sprocket wheel and chain connection 19. The shaft 18 is rotatably mounted in pillow blocks 20 and 21 which are fastened to a plate 22. The plate 22 constitutes a part of the stationary support. It is supported in fixed position above the base frame by a pair of leg members 23 and 24 and a cross-member 25 at one end of the plate, and by another pair of leg members 26 and 27 and a cross-member 28 at its other end.

The power-driven shaft 18 overhangs the pillow block the bearing 21 and the overhanging end of the shaft carries a pair of wheels 29, 30, which are adapted to engage the inner surface 31 of a pipe which is to be rotated thereby. A rubber-covered roller 32 is rotatably mounted at right angles to the power-driven shaft 18 in the vertical plane of the shaft, the upper bearing 33 for the roller being secured to the cross-member 28 and the lower bearing 34 being secured to a cross-member 35. This roller limits the extent of movement of the pipe 12 toward the stationary support 10.

During a coating operation a pipe 12 is suspended at one end by the wheels 29, 30, and at the other end by the wheels 36 and 37 which are fast to a dead shaft 38 rotatably mounted on the movable support 11. These wheels preferably have rubber running surfaces or treads and, if desired, only one wheel may be used on each shaft.

The shaft 38 is rotatably mounted in pillow blocks 39 and 40 which are fastened to a horizontal plate 41 of the movable support 11. The plate is secured to a pair of channel members 42 and 43, the channel member 42 being secured to a pair of standards 44, and the channel member 43 being secured to another pair of standards 45. These standards extend upwardly from a lower box frame including two longitudinally extending side members 46 and 47 in the form of H-beams, which are spaced apart and rigidly connected together by cross-members 48, 49 and 50.

The box frame is pivotally mounted and is normally disposed between a pair of spaced-apart and longitudinally extending stringers 51 and 52 which are connected at their ends by cross-beams 53 and 54. These stringers and beams may be elements of a fixed floor or otherwise supported in a stable position. Pillow blocks 55 and 56 are respectively fastened to the undersides of the stringers 51 and 52. These pillow blocks support a pivot shaft 57 which is engaged in bores extending through two brackets 58 and 59 which are attached to the undersides of the longitudinally extending side members 46 and 47 of the box frame, whereby the box frame is supported for pivotal movement about the axis of the pivot shaft.

The box frame has fastened to it a bracket 60 which extends downwardly therefrom. This bracket carries a pair of parallel plates 61 and 62, in which a pin 63 is journalled. This pin is engaged by an end of a piston rod 64 of a fluid-operated cylinder 65 which is pivotally supported at 66 to a bracket 67 attached to the cross-beam 53. The bracket 67 is in a fixed position and as pressure is applied to the piston within the cylinder 65, the pivoted support 11 and the dead shaft 38 may be moved into and out of operating position, as shown in Fig. 2, depending on the direction of movement of the piston 64.

The pivoted support 11 is displaced from operating position whenever it is desired to place a pipe around the wheels 29, 30. The pipe is moved lengthwise over the wheels 29 and 30 by means of a travelling crane and when it is located in proper position the cylinder 65 is operated to raise the pivoted support and position the shaft 38 horizontally and the wheels 36 and 37 within the pipe. When this has been accomplished, the pipe may be lowered to rest upon the wheels.

A rubber-covered roller 68 is located on the movable support 11 on an axis intersecting the axis of the shaft 38 and in such position as to be engageable by an end of a pipe to limit the movement of the pipe toward the support. The roller is journalled at its upper end in a pillow block 69 fast to the channel member 42 and at its lower end in a pillow block 70 fast to the cross-member 49.

The pivoted support 11 is locked in its horizontal position by locking devices located at opposite sides of the box frame adjacent the free ends of its side members 46 and 47. One of the locking devices includes an operating cylinder 71 attached to a sleeve 72 supported by the stringer 51, as best seen in Fig. 3, and the other locking device includes an operating cylinder 73 attached to a sleeve 74 supported by the stringer 52. The respective sleeves pass through openings in the webs of the respective stringers 51 and 52 and have radially outwardly extending flanges which are welded to the stringers. Sleeves 75 and 76 are similarly mounted on and secured to the side members 46 and 47, respectively, of the movable support. The sleeves are so mounted that they are aligned when the support 11 is in operating position so that a cylindrical bolt may overlap and engage adjacent ends of cooperating sleeves and prevent movement of the support.

The bolts 77 and 78 are respectively fastened to piston rods 79 and 80 which are slidably mounted in the cylinders 71 and 73, respectively. Both of the locking devices are similarly constructed and similarly operated. The bolts 77 and 78 are simultaneously moved into and displaced from their locking positions by controlling the application of hydraulic pressure in the cylinders 71 and 73. The bolts are tapered at their forward ends to ease their engagement with the bores of the respective sleeves 75 and 76. As the bolts move along the respective sleeves 75 and 76 they engage, respectively, actuating pins 81 and 82 of a pair of micro-switches 83 and 84.

The switches 83 and 84 are connected in series with the motor M and a starting switch 85 so that unless both of the bolts 77 and 78 are in locking position and both of the switches 83 and 84 are closed, the operator cannot operate the motor to rotate the power-driven shaft 18.

The movements of the pivoted support 11 to carry the dead shaft 38 between its operating position and its inactive position as shown in broken lines in Fig. 2 are controlled by an hydraulic system. A schematic hydraulic system is illustrated in Fig. 4. This system includes a pump 86, a reservoir 87, two four-way valves 88 and 89, the hydraulic cylinders 71, 73 and 65 and pipe connections therebetween. In this diagram the piston rod 64 is located in a retracted position in which the pivoted support 11 is depressed or out of operating position, and the locking bolts 77 and 78 are withdrawn. Upon turning the valve 89 to direct the pressure from the pump 86 to the head of the piston rod 64, the supporting frame 11 is pivoted to its upright or operating position. When the frame is upright, as shown in Fig. 2, the valve 88 is turned to direct the pump pressure to the head ends of the pistons 79 and 80, whereupon the bolts 77 and 78 are advanced to lock the frame in operating position. In this position the bolts 77 and 78 have engaged the plungers 81 and 82 of the switches 83 and 84 and have closed these switches so that the motor may be operated to drive the power shaft 18.

After a coating operation has been completed, the pipe or other hollow body is raised from the supporting wheels and the valve 88 is turned to cause retraction of the locking bolts 77 and 78. A valve 90 reduces the flow of fluid from the head ends of the cylinders 71 and 73 to slow the retracting movements of the pistons 79 and 80. After the locking bolts 77 and 78 have been withdrawn from the sleeves 75 and 76, the valve 89 is turned to reverse the pressure connections between the pump and the cylinder 65 to cause the lowering of the pivoted support 11 so that the coated pipe may be removed. A valve 91 reduces the flow of fluid from the cylinder 65 to the reservoir 87 to control the lowering of the pivoted support.

The apparatus is particularly suitable for use in coating a variety of sizes of pipes which are limited only by the diameters of the supporting wheels and the height of the wheels above the floor level. The depressibility of the movable frame provides complete freedom for the manipulation of pipes.

While the form of apparatus herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In an apparatus for revolving any one of a number of pipes of different diameters to enable the application of a coating of material to the exterior thereof, a continuous rotatably power-driven shaft and a rotatable dead shaft, a stationary support for rotatably supporting said power-driven shaft in operating position, said power-driven shaft having one of its ends overhanging said support, a movable support for said dead shaft, said dead shaft having one of its ends overhanging said movable support and extending in axial alignment with and toward said power-driven shaft when said movable support is in operating position, means pivotally mounting said movable support for movement of said dead shaft to and from axial alignment with said power-driven shaft, a wheel fixedly mounted on each of said overhanging ends of said shafts, said wheels being spaced from each other for rotation in parallel planes and adapted to loosely suspend a pipe having an inner diameter greater than the diameter of the outer peripheral surfaces of said wheels with said surfaces in frictional running engagement with the interior of the pipe when said movable support is in operating position, means for continuously rotating said power shaft and said pipe supported on said wheels, means engageable with the ends of said pipe for preventing longitudinal displacement of said pipe with respect to said wheels, and power-operated means for moving said movable support and said dead shaft from pipe-suspending position to allow space for the endwise movement of said pipe to and from around the wheel mounted on said power-driven shaft.

2. An apparatus for revolving any one of a number of pipes of different diameters to enable the application of a coating of material to the exterior thereof, a stationary support, a continuously rotatable power-driven shaft rotatably mounted on said support and having an end extending beyond the support, a wheel fixedly mounted on said end of said shaft in overhanging relation to said support, a movable support, a dead shaft rotatably mounted on said movable support and having an end extending beyond said movable support, a wheel mounted on said end of said dead shaft in overhanging relation to said movable support, means pivotally mounting said movable support for movement of said dead shaft to and from operating position opposite from said power-driven shaft, releasable means for holding said movable support in a position in which said ends of said shafts extend towards each other and said wheels are spaced from one another for engaging the interior of a pipe, means for continuously rotating said power-driven shaft for revolving said pipe engaged interiorly and supported by said wheels, a roller rotatably mounted on each of said supports, said rollers extending at right angles to said shafts and disposed adjacent the ends of said supports from which said shafts overhang, said rollers being adapted to engage the respective ends of a pipe mounted on said wheels, and power-operated means for displacing said movable support, said dead shaft and one of said rollers to enable the placing of a pipe over the wheel on said power-driven shaft and in the space between said rollers.

3. An apparatus for revolving any one of a number of pipes of different diameters to enable the application of a coating of material to the exterior thereof, a stationary support, a continuously rotatable power-driven shaft rotatably mounted on said support and having one end extending beyond the support, a wheel fixedly mounted on said end of said shaft in overhanging relation to said support, a movable support, a dead shaft rotatably mounted on said movable support and having one end extending beyond said movable support, a wheel mounted on said end of said dead shaft in overhanging relation to said movable support, means pivotally mounting said movable support, said means including a pivot shaft disposed at right angles to said dead shaft whereby said movable support and said dead shaft may be moved from a position in which said dead shaft is parallel to said power-driven shaft to a position in which said dead shaft is angularly disposed with respect to said power-driven shaft, power-operated means for pivotally moving said movable support between said positions, and means for locking said movable support in the position in which said dead shaft is parallel to said power-driven shaft.

4. In apparatus for revolving any one of a number of pipes of different diameters to enable the application of a coating of material to the exterior thereof, a stationary support, a continuously rotatable power-driven shaft rotatably mounted on said support and having an end extending beyond the support, a wheel fixedly mounted on said end of said shaft in overhanging relation to said support, a movable support, a dead shaft rotatably mounted on said movable support and having an end extending beyond said movable support and towards said stationary support, a wheel mounted on said end of said dead shaft in overhanging relation to said movable support, means for holding said movable support in a position in which said wheels are axially spaced apart from one another in parallel relationship so as to engage the interior of a pipe adjacent its respective ends, and means for moving said movable support and dead shaft from said position to another position to enable endwise movement of the pipe to and from around the wheel mounted on said power-driven shaft, said last-named means including a pressure-operated hydraulic system operable to actuate said holding means into and out of holding condition and to move said movable support between said positions.

References Cited in the file of this patent

UNITED STATES PATENTS

| | | |
|---|---|---|
| 1,580,188 | Wright et al. | Apr. 13, 1926 |
| 1,591,193 | Weaver | July 6, 1926 |
| 2,104,362 | Cummings | Jan. 4, 1938 |
| 2,227,688 | Wood | Jan. 7, 1941 |
| 2,291,823 | Mickelson et al. | Aug. 4, 1942 |
| 2,687,854 | Lorig | Aug. 31, 1954 |